(No Model.)
J. PAOLI.
HAND LEVEL.
No. 518,678. Patented Apr. 24, 1894.
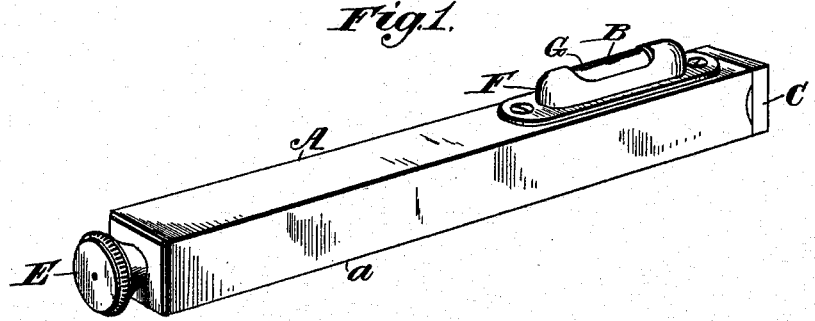
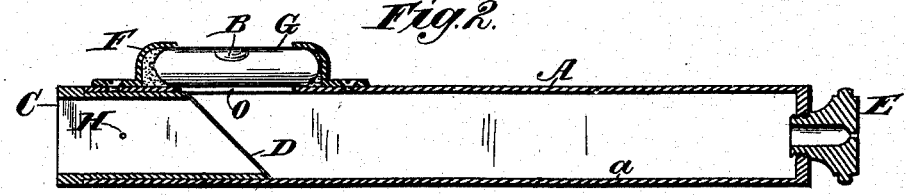
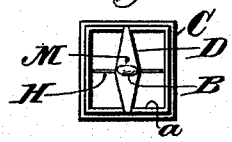
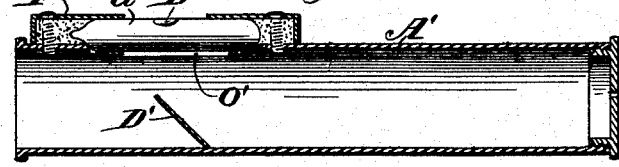
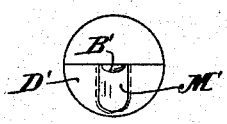
Witnesses.
James P. Downs
Chas. B. Jessup
Inventor.
John Paoli
By William R. Baird
His Attorney
THE NATIONAL LITHOGRAPHING COMPANY,
WASHINGTON, D. C.

UNITED STATES PATENT OFFICE.

JOHN PAOLI, OF HOBOKEN, NEW JERSEY.

HAND-LEVEL.

SPECIFICATION forming part of Letters Patent No. 518,678, dated April 24, 1894.

Application filed June 22, 1893. Serial No. 478,452. (No model.)

*To all whom it may concern:*

Be it known that I, JOHN PAOLI, of Hoboken, in the county of Hudson and State of New Jersey, have invented certain new and useful Improvements in Hand-Levels; and I do hereby declare the following to be a full, clear, and exact description of the invention, such as will enable others skilled in the art to which it appertains to make and use the same.

My invention relates to hand levels for engineers' use and its novelty consists in the construction and adaptation of the parts as will be more fully hereinafter pointed out. The hand levels now commonly employed are used principally in making preliminary surveys. They consist of a tube having a circular cross section, and closed at one extremity by an eye piece, the other extremity being open. Outside of this tube and near the open end is mounted a level containing a bubble. Inside of the tube and underneath the center of the level is rigidly secured in place to the lower half of the tube a bridge displaying a mirror inclined at an angle of forty-five degrees. This construction is illustrated in Figures 4 and 5 of the drawings hereinafter referred to. The manner of using a device of this kind is as follows: The surveyor, standing at one point on the line which he is to survey, places the eye piece of the tube at his eye and looks through the instrument in the direction of the proposed line. When the tube is held perfectly horizontal the image of the bubble in the mirror will appear to be bisected by the upper edge of the mirror. He then identifies some natural object within the field of vision above the mirror, for instance a tree or a rock, and, by measuring the distance between his position originally and such object he has secured the dimensions of the hypotenuse and one side of a right angled triangle from which the angles and horizontal distance are readily ascertained by well known methods.

It is obvious that in an instrument such as I have described there is a great disadvantage in cutting off the entire lower half of the field of vision by the mirror and the bridge which supports it. The instrument is likewise capable of adjustment only by the apparent motion of the image of the bubble from the lower edge of the circular field to its horizontal diameter. The semi-circular field through which the natural objects are seen and identified makes it difficult to cover any but a small field of vision, and that with a tube of comparatively large diameter.

The object of my invention is to overcome these disadvantages, and this I do, first, by making the tube of the instrument of square section, or at least with its upper and lower sides horizontal when the instrument is in position; secondly, by making the mirror cover the entire surface of its supporting bridge and placing it in a vertical plane through which the image of the bubble apparently moves, at the same time making it so narrow that it obstructs but a small part of the field of vision; thirdly, by making this mirror and bridge of rhomboidal form with its shortest diagonal in the horizontal and its longest diagonal in the vertical plane; fourthly, by placing a horizontal hair like rod in front of the mirror bridge and substantially coincident with its horizontal diagonal, and, fifthly, by making the portion of the instrument containing the bridge and mirror removable for ease in cleansing.

In the drawings, Fig. 1 is a perspective view of my device. Fig. 2 is a central vertical longitudinal section of the same. Fig. 3 is an end plan view of the separable section containing the bridge mirror piece. Fig. 4 is a central vertical longitudinal section of the old form of hand level, and Fig. 5 is an end view of the same as it appears when looking through the eye piece when the level is in position.

In the drawings, A is a tube made of any suitable material, but preferably of metal. It is square in cross section, and its lowest side *a* is so made as to be horizontal when the instrument is level. At one extremity is inserted an eye piece E made in the usual manner. Toward the other extremity of the instrument, and mounted on its upper side, is a frame F secured in place in any suitable manner and inclosing the glass G containing a fluid and displaying a bubble B, in the manner well known to the art. An aperture O in the tube is made under the central portion of the glass. At the end of the tube A, and opposite the eye piece, is a removable section C, adapted to snugly fit within its walls. This section is cut off accurately at its inner extremity at an angle of forty-five degrees, and it is provided with a bridge D the outer surface of which forms a mirror M. This bridge is secured in place by any suitable means. The bridge and mirror is made rhomboidal in shape with its shortest diagonal in a horizontal plane and its longest diagonal in a vertical plane. In effect it is formed of two isosceles triangles with their bases joined horizontally. Back of this bridge is a hair like rod H which, when the instrument is in position, is in the same horizontal plane and parallel to the horizontal diagonal of the mirror. This insures accuracy in adjustment.

In Figs. 4 and 5 I have illustrated the old form of hand mirror referred to above. In these views A' is the tube, G' the glass, F' the frame supporting it, B' the bubble, and O' the aperture of the tube through which the bubble is reflected, and D' is the bridge provided with the mirror section M'.

By my new construction I secure an instrument which gives a field of vision equal to or larger than that of the old form, and with a smaller area of cross section. It is more convenient to clean and handle and takes up less space. It is more accurately and easily adjusted and may, in addition, be used as an ordinary mechanic's level.

Having described my invention, what I claim as new is—

1. In a hand level, the combination with a narrow mirror, adapted to reflect the bubble and crossing the field of vision in a vertical plane, of a horizontal rod in the same horizontal plane as the center of the mirror.

2. In a hand level, a mirror of rhomboidal form, and having its longest and shortest diagonals coincident with the vertical and horizontal center lines of the field of vision.

3. A hand level having a substantially square field of vision and provided with a rhomboidal mirror the diagonals of which are coincident with the center lines of said field of vision, and which is adapted to remain stable when the bubble is in its central position.

In testimony whereof I have signed this specification in the presence of two subscribing witnesses.

JOHN PAOLI.

Witnesses:
CHARLES WILLICH, Jr.,
OTTO HOGREF.